(12) United States Patent
Quince et al.

(10) Patent No.: US 9,028,135 B1
(45) Date of Patent: May 12, 2015

(54) PYROMETER

(75) Inventors: Asia N. Quince, Houston, TX (US);
Alexander Stein, Secaucus, NJ (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 350 days.

(21) Appl. No.: 13/349,265

(22) Filed: Jan. 12, 2012

(51) Int. Cl.
*G01K 15/00* (2006.01)
*G01K 19/00* (2006.01)

(52) U.S. Cl.
CPC .............. *G01K 15/00* (2013.01); *G01K 19/00* (2013.01)

(58) Field of Classification Search
CPC ......... G01K 15/00; G01K 19/00; G01K 3/04; G01K 11/06; G01K 7/42; G01K 13/08; G01K 1/16; G01J 5/522; G01J 5/0003; G01J 5/02; G01J 5/04; G01J 5/08
USPC .................................. 374/121, 120, 102–104
See application file for complete search history.

(56) References Cited

U.S. PATENT DOCUMENTS

| | | | | |
|---|---|---|---|---|
| 2,831,340 | A * | 4/1958 | Crandall et al. | 374/56 |
| 3,238,470 | A * | 3/1966 | Mooney | 372/72 |
| 3,266,313 | A * | 8/1966 | Litterst | 374/130 |
| 5,229,612 | A * | 7/1993 | Pompei et al. | 250/349 |
| 5,282,017 | A * | 1/1994 | Kasindorf et al. | 356/446 |
| 5,762,419 | A | 6/1998 | Yam | |
| 5,822,222 | A | 10/1998 | Kaplinsky | |
| 5,938,335 | A | 8/1999 | Yam | |
| 5,994,701 | A | 11/1999 | Tsuchimoto | |
| 6,357,910 | B1 | 3/2002 | Chen | |
| 6,816,803 | B1 | 11/2004 | Palfenier | |
| 6,862,549 | B1 | 3/2005 | Palfenier | |
| 7,118,271 | B2 | 10/2006 | Schoenlein | |
| 7,438,468 | B2 | 10/2008 | Adams | |
| 7,452,125 | B2 | 11/2008 | Volf | |
| 7,473,032 | B2 | 1/2009 | Worrell | |
| 7,734,439 | B2 | 6/2010 | Timans | |
| 2007/0114421 | A1 * | 5/2007 | Maehlich et al. | 250/343 |
| 2008/0033300 | A1 | 2/2008 | Hoang | |
| 2009/0297336 | A1 | 12/2009 | Allen | |

OTHER PUBLICATIONS

M Bober, Karow H U, Symposium on Thermophysical Properties page 7th Series, U.S. Bureau of Standards: 344-350 Year of publication: 1977.*

* cited by examiner

*Primary Examiner* — Lisa Caputo
*Assistant Examiner* — Janice M Soto
(74) *Attorney, Agent, or Firm* — Theodore U. Ro

(57) ABSTRACT

A non-contact pyrometer and method for calibrating the same are provided. The pyrometer includes a radiation sensor configured to measure at least a portion of a radiance signal emitted from a target medium and output a voltage that is a function of an average of the absorbed radiance signal, and an optical window disposed proximate the radiation sensor and configured to control a wavelength range of the radiance signal that reaches the radiation sensor. The pyrometer may further include a reflective enclosure configured to receive the target medium therein, wherein the radiation sensor and the optical window are disposed within the reflective enclosure, an amplifier in communication with an output of the radiation sensor, and a data acquisition system in communication with an output of the amplifier.

14 Claims, 3 Drawing Sheets

PYROMETER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND

1. Field

Embodiments described herein generally relate to non-contact thermal measurements.

2. Description of the Related Art

Pyrotechnic firing circuits typically include an electroexplosive device such as an initiator. Within the initiator is a pyrotechnic composition, which is in contact with a small thin wire known as a "bridgewire." Using a firing circuit, an electric current is passed through the bridgewire to heat the wire to a temperature sufficient to start an exothermic chemical reaction in the pyrotechnic composition. The bridgewire melts during the transfer of the electrical current resulting in an open circuit.

One concern with an electroexplosive device, however, is an inadvertent firing of the device from stray current entering the firing circuitry as a result of electromagnetic fields and radio frequency environments. Previous methodologies for limiting the risk of inadvertent firing have included fuses, flash bulbs, or go/no-go pyrotechnic stray energy indicators. Fiber optic systems have also been developed that can provide real-time thermal monitoring of bridgewires for pyrotechnic applications. These methodologies and systems, however, are often sizable, not portable, and not reusable by design or because they are susceptible to damage.

A need exists, therefore, for improved systems and methods for measuring stray energy through firing circuits and bridgewires that are compact in size, portable, and/or reusable.

SUMMARY

Embodiments of the disclosure may generally provide a pyrometer that includes a radiation sensor configured to measure at least a portion of a radiance signal emitted from a target medium and output a voltage that is a function of an average of the absorbed radiance signal, and an optical window disposed proximate the radiation sensor and configured to control a wavelength range of the radiance signal that reaches the radiation sensor. The pyrometer may further include a reflective enclosure configured to receive the target medium therein, wherein the radiation sensor and the optical window are disposed within the reflective enclosure, an amplifier in communication with an output of the radiation sensor, and a data acquisition system in communication with an output of the amplifier.

Embodiments of the disclosure may further provide a non-contact system for measuring a temperature of a target medium, wherein the system may include a reflective enclosure having the target medium at least partially therein, a radiation sensor, and an optical window disposed therein. The radiation sensor may be configured to absorb at least a portion of power of a radiance signal emitted from the target medium and a voltage that is a function of an average of the absorbed power, and the optical window may be disposed proximate the radiation sensor and configured to control which wavelength range of the radiance signal reaches the radiation sensor. The system may further include an amplifier electrically connected to an output of the radiation sensor, and a data acquisition system electrically connected to an output of the amplifier.

Embodiments of the disclosure may further provide a method for calibrating a pyrometer, wherein the method may include at least partially enclosing a target medium with a first end of a reflective enclosure of a first pyrometer, wherein the reflective enclosure has a radiation sensor disposed proximate a second end thereof and an optical window disposed proximate the radiation sensor, wherein the radiation sensor is configured to receive a radiance signal from the target medium and output a signal proportional to a magnitude of the radiance signal, and wherein the optical window is configured to control which wavelength range of the radiance signal reaches the radiation sensor. The method may further include applying a first voltage to the target medium to produce a first current, measuring a first output signal of the first pyrometer corresponding to the first current, applying second voltage to the target medium to produce a second current, and measuring a second output signal of the first pyrometer corresponding to the second current. The method may further still include placing a calibrated pyrometer proximate the target medium, wherein the target medium has the first current therethrough, measuring a third output signal of the calibrated pyrometer corresponding to a first temperature of the target medium at the first current, determining a first radiance of the target medium at the first current using a Planck integral, the wavelength range, and the first temperature, calculating a first ratio between the first output signal and the second output signal, and determining a second temperature of the target medium at the second current using the Plank integral, the wavelength range, the first radiance, and the first ratio.

DETAILED DESCRIPTION

The amount of stray energy affecting a portion of a system, known as a target medium, can be calculated by determining the current through the target medium. Since the target medium emits thermal radiation as a function of the current therethrough, the current can be determined by taking non-contact temperature measurements of the target medium. The thermal radiation can be measured and correlated to the current, and the calculated current can then be used to calculate stray energy through the target medium or through a circuit electrically connected to the target medium. "Thermal radiation," as use herein, refers to one or more radiance signals or electromagnetic waves. The thermal radiation has a magnitude equivalent to the radiance signals' power.

Figure 1:
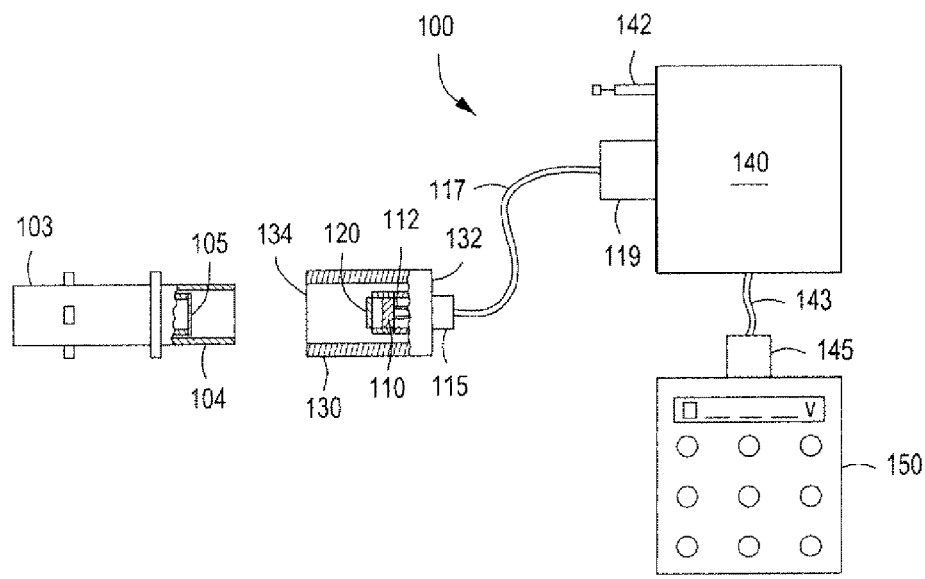
FIG. 1 depicts a partial cross-sectional view of an exemplary pyrometer for taking non-contact temperature measurements of a target medium, according to one or more embodiments described.

FIG. 1 depicts a partial cross-sectional view of an exemplary pyrometer 100 for taking non-contact temperature measurements of a target medium 105, according to one or more embodiments. The pyrometer 100 includes a radiation sensor 110 configured to measure the thermal radiation emitted from the target medium 105 and output an electrical signal representative of the magnitude of the measured thermal radiation. For example, the radiation sensor 110 can be configured to absorb at least a portion of the power of the thermal radiance signals emitted from the target medium 105 and configured to output a voltage representative of the thermal radiance measurement, e.g., the voltage can be a time average of the absorbed thermal radiation or power. Suitable radiation sensors can include, but are not limited to, thermopile detectors or sensors, infrared sensors, bolometers, pyroelectric detectors, quantum detectors, or other non-contact radiation sensors.

The pyrometer 100 can further include a generally transmissive optical window 120 disposed proximate the radiation sensor 110. For example, the optical window 120 can be disposed on (in contact with) or adjacent to the radiation sensor 110. In another example, the radiation sensor 110 can be made and/or manufactured with the optical window 120 disposed thereon. The optical window 120 can be configured to be disposed between an input to the radiation sensor 110 and the target medium 105 and is generally configured to transmit radiation therethrough with minimal interference or distortion.

The target medium 105 can emit radiance signals over a broad range of wavelengths, e.g., wavelengths ranging from about 10 nanometers ("nm") to about 1 meter. The optical window 120 can, for example, be configured to filter predetermined wavelengths of the radiance signals, thus determining a band or range of radiance signals that are allowed to reach the radiation sensor 110. In one example, the optical window 120 can transmit wavelengths ranging from a low of about 0.1 micrometers ("μm"), about 1 μm, about 2 μm, or about 3 μm up to a high of about 5 μm, about 10 μm, about 15 μm, or about 20 μm. In another example, the optical window 120 can transmit wavelengths ranging from about 0.5 μm to about 17 μm, about 1.5 μm to about 12 μm, or about 2.5 μm to about 8 μm.

The optical window 120 can be composed of sapphire, silicon, germanium, combinations thereof, or the like. When the optical window 120 is composed of sapphire, it can be configured to transmit a wavelength range of about 0.1 μm to about 5 μm, for example. When the optical window 120 is composed of silicon, it can be configured to transmit a wavelength range of about 6.5 μm to about 14 μm or about 1 to about 15 μm, for example. When the optical window 120 is composed of germanium, it can be configured to transmit only a wavelength range of about 2 μm to about 20 μm, for example. In addition, the material used for the optical window 120 can be coated to modify the wavelength transmission through the optical window 120, as it is known in the optical art that coatings may be used to modify the transmission of an optical component by wavelength-dependent absorption.

The inventors have determined through experimentation that for a very small (small generally means below the spatial resolution of the pyrometer, which would include target sizes of less than 0.1 mm) target medium 105 at a high temperature (high temperature generally means above 500 C in the present application), a sapphire optical window 120 having a wavelength range of about 0.1 μm to about 5 μm can obtain a more accurate measurement of the absorbed power of radiance signals of the target medium 105 than the silicon optical window 120 having a wavelength range of about 6.5 μm to about 14 μm. Specifically, it was found that the higher wavelength range tended to capture the temperature, i.e., radiance signal, of a housing for the target medium 105, in addition to the target medium 105 itself. However, it was found that the silicon window 120 having a wavelength range of about 6.5 μm to about 14 μm was more accurate than the sapphire window 120 at measuring lower temperatures of the target medium 105. Specifically, the signal output from the radiation sensor 110 using the sapphire window 120 decreases steeply to zero thereby preventing measurements at lower temperature levels (generally less than 500° C.), whereas the radiation sensor 110 using the silicon window 120 maintains a more gradual signal decline at lower temperatures The radiation sensor 110 is generally disposed in or attached to a housing 115. The housing 115 can at least partially surround the radiation sensor 110 and can enclose wires 112 and/or circuitry extending from radiation sensor 110. The housing 115 can be composed of plastics, metals (e.g., stainless steel), ceramics, combinations thereof, or the like.

The radiation sensor 110 and the optical window 120 can be at least partially disposed in a reflective casing or enclosure 130. For example, the housing 115 can join and/or position the radiation sensor 110 and the optical window 120 inside a first end 132 of the reflective casing 130. A second end 134 of the reflective casing 130 can be configured to receive the target medium 105 such that the reflective enclosure 130 at least partially surrounds the target medium 105. For example, a first end 104 of an initiator 103 containing the target medium 105 can be configured to join, slot, fasten, mate, or otherwise fit into the second end 134 of the reflective enclosure 130 so that the target medium 105 and at least part of the first end 104 are surrounded or encompassed by the second end 134.

The reflective casing 130 can be configured to collect or channel the radiance signals emitted from the target medium 105 toward the radiation sensor 110 and/or the optical window 120 to increase the power absorbed by the radiation sensor 110 from the aggregate of the radiance signals. The reflective enclosure 130 generally increases the signal strength (quantity) of radiance signals directed towards the radiation sensor 110, thus increasing the measurement accuracy of the pyrometer 100. For example, the reflective enclosure 130 can affect anywhere from about a 50% to about a 100% increase in the power absorbed by the radiation sensor 110. In at least one embodiment, the reflective enclosure 130 can be considered an metal fitting or an electrical connection between the target medium 105 and the radiation sensor 110.

The reflective enclosure 130 can position the radiation sensor 110 at a distance from the target medium 105, i.e., the target medium 105 is generally separated from the radiation sensor 110 within the reflective enclosure 130. For example, the radiation sensor 110 can be positioned anywhere from about 5 mm to about 25 mm away from the target medium 105. Positioning the radiation sensor 110 at a distance from the target medium 105 can at least partially protect the radiation sensor 110 from damage caused by melting of the target medium 105, thereby improving the reusability of the pyrometer 100.

The reflective enclosure 130 can have various shapes, including, but not limited to, a sphere, a cylinder, an ellipsoid of rotation, a rectangular prism, a triangular prism, other polygonal prisms, combinations thereof, or the like. The second end 134 of the reflective enclosure 130 and a structure or housing holding the target medium 105, e.g., the initiator 103, may in some embodiments be sized and shaped similarly so that one can be received in the other in a tight tolerance fit.

The reflective enclosure 130 can be composed of a reflective material and/or coated on an interior with a reflective material. Reflective materials can include, but are not limited to, stainless steel, copper, nickel, gold, alloys, combinations thereof, or the like. Reflective coatings can include, but are not limited to, gold, nickel, gold-plated nickel combination thereof, or the like.

Many methods of amplifying detector signals and storing the same are known in the art. For example, an amplifier 140 can be electrically connected to the radiation sensor 110 via one or more wires/connections 117 that may be joined to the amplifier 140 via thermocouple connector 119 or other connection method. The amplifier 140 may be activated by a switch 142, and a data acquisition system 150, with or without a voltage input adaptor/convertor 145, may be in communication with the amplifier 140.

Although not shown, the reflective enclosure 130 having the optical window 120 and the radiation sensor 110 disposed therein, the amplifier 140, and the data acquisition system 150 can all be disposed in a single housing to form the pyrometer 100. For example, the entire pyrometer 100 can be disposed in a housing that is sized to be hand-held so that it is compact and portable. In another example, the reflective enclosure 130 having the optical window 120 and the radiation sensor 110 disposed therein, the amplifier 140, and the data acquisition system 150 can all be modules that together form a handheld pyrometer 100.

The target medium 105 generally includes any material or portion of material that emits the radiance signals. For example, the target medium 105 can be a bridgewire for the initiator 103. Suitable materials for the target medium 105 include, but are not limited to, metals, polymers, natural or synthetic fibers, fluids, combinations thereof, or the like. For example, the target medium 105 can be at least a portion of a stainless steel or copper wire having a current flowing therethrough. In one example, the target medium 105 can be a wire having a diameter ranging anywhere from about 0.01 mm to about 2 mm and a length ranging anywhere from about 0.5 mm to about 5.5 mm. In another example, the diameter of the wire can range from about 0.05 mm to about 0.1 mm and the length of the wire can range from about 2 mm to about 4 mm.

As discussed and described above, the target medium 105 can be disposed within the initiator 103 having the first end 104 that is configured to join, slot, fasten, mate, or otherwise fit into the reflective enclosure 130. For example, the second end 134 of reflective enclosure 130 can be threaded to threadably engage mating threads on the first end 104 of the initiator 103. Although initiators generally have a threaded port end where a stray energy indicator can be threadably attached, in another exemplary embodiment, the first end 104 may alternatively include clip or slot into the second end 134. The initiator 103 can be composed of materials including, but not limited to, metal, metal alloy, ceramic, combinations thereof, or the like.

Figure 2:
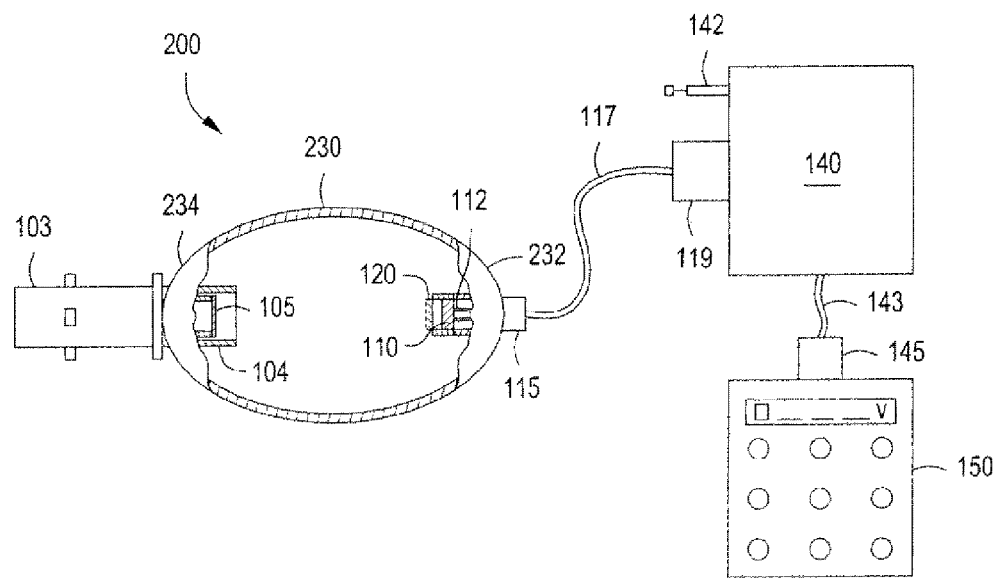
FIG. 2 depicts a partial cross-sectional view of another exemplary pyrometer, according to one or more embodiments described.

FIG. 2 depicts a partial cross-sectional view of another exemplary pyrometer 200, according to one or more embodiments. The reflective enclosure 230 of the pyrometer 200 is generally an ellipsoid of rotation, e.g., a prolate spheroid. A first end 232 of the reflective enclosure 230 is at least partially disposed around or proximate to the housing 115 of the radiation sensor 110, and a second end 234 of the reflective enclosure 230 can be configured to be at least partially disposed around or about the target medium 105. The second end 234 can be configured to be disposed around the first end 104 of the initiator 103, for example. The first end 232 can have a first focal point of the ellipsoid and the second end 234 can have a second focal point of the ellipsoid. A focal point refers to an area of the reflective enclosure where radiance signals initiated at another focal point are concentrated or focused. For example, the radiation sensor 110 can be disposed at or very near the first focal point and the target medium 105 can be disposed at or very near the second focal point so that radiance signals from the target medium 105 are focused on or primarily received by the radiation sensor 110.

Efficient collection of thermal radiation from the target medium 105 onto the radiation sensor 110 is extremely important in obtaining accurate temperature measurements for a thin and short target medium, e.g., an initiator bridgewire, as this class of target medium emits only a small amount of thermal radiation even at elevated temperatures. Shaped as an ellipsoid of rotation, the reflective enclosure 230 efficiently collects the thermal radiation emitted by the target medium 105 onto the radiation sensor 110 thereby increasing the power absorbed by the radiation sensor 110 to increase the accuracy of temperature measurements. For example, the reflective enclosure 230 can collect nearly all, e.g. at least 90%, at least 95%, at least 99%, or more, of the thermal radiation emitted by the target medium 105 onto the radiation sensor 110. In another example, the reflective enclosure 230 can increase the power absorbed by the radiation sensor 110 by anywhere from a factor of about 5 to a factor of about 10. The reflective enclosure 230 can collect about five times more of the emitted thermal radiation onto the radiation sensor 110 than a cylindrical shaped reflective enclosure, e.g., the reflective enclosure 130 depicted in FIG. 1.

Figure 3:
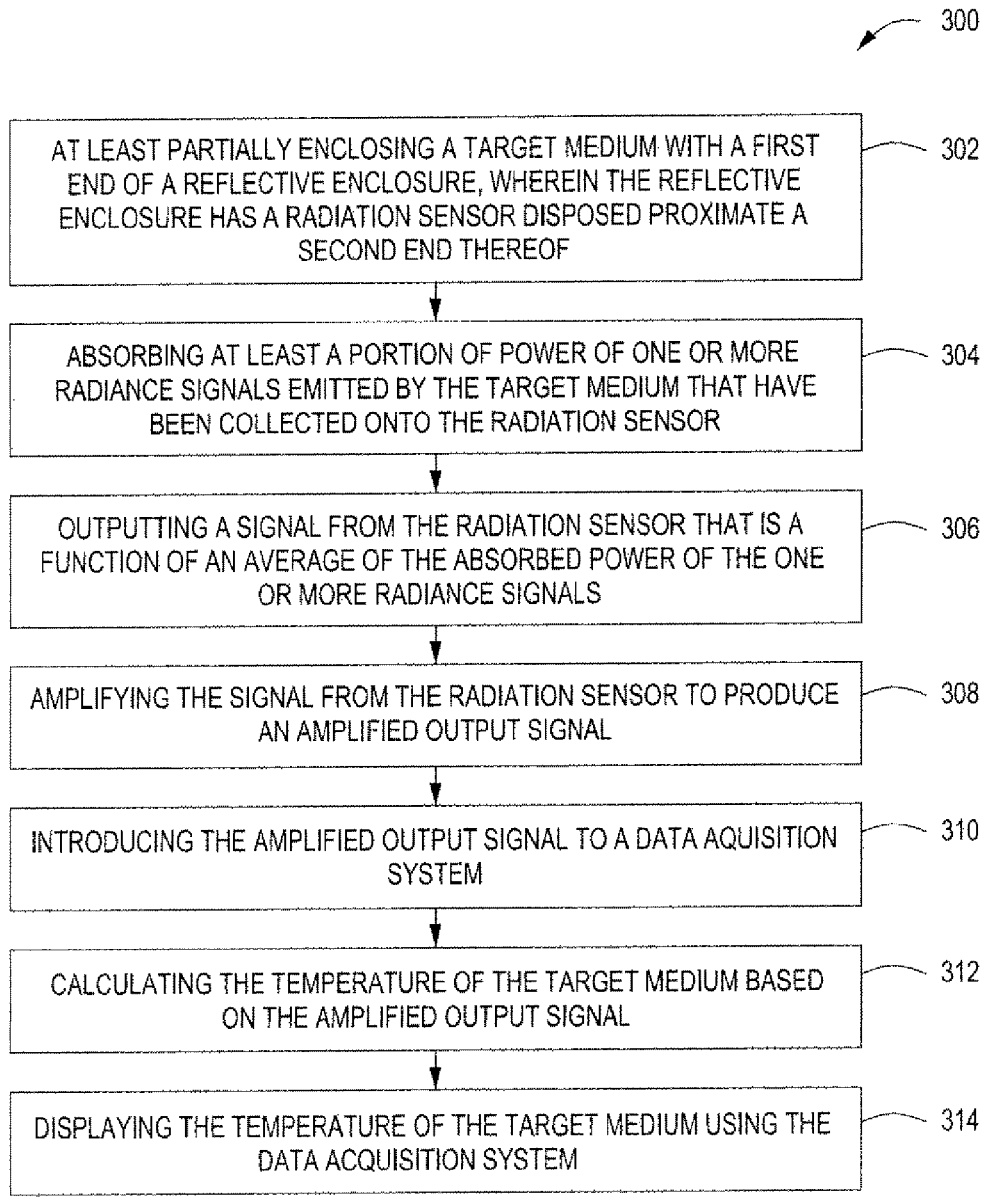
FIG. 3 is a flowchart of an exemplary method for performing noncontact temperature measurement of a target medium, according to one or more embodiments described.

Referring to FIG. 3, with continuing reference to FIGS. 1-2, illustrated is a flowchart of an exemplary method 300 for performing noncontact temperature measurement of the target medium 105. In operation, the pyrometers 100, 200 (individually or collectively) can be used to make non-contact temperature measurements of the target medium 105. The target medium 105 is at least partially enclosed with the first end 134, 234 of the pyrometer 100, 200 so that the radiation sensor 110 is disposed at the opposite or second end 132, 232, as at 302. The reflective enclosures 130, 230 can collect or otherwise direct the radiance signals onto the radiation sensor 110 to increase the power absorbed by the radiation sensor 110. The radiation sensor 110 can absorb at least a portion of the power of the radiance signals emitted by the target medium 105 and transmitted through the optical window 120, as at 304. The radiation sensor 110 can output a signal, e.g., a voltage, that can be a function of an average of the absorbed power, as at 306. In other embodiments, the output voltage can be just a voltage measurement that is not already averaged. The output signal can be amplified by the amplifier 140 to produce an amplified output signal, as at 308. Amplifying the output signal from the radiation sensor 110 generally increases the resolution of the average power absorbed by the radiation sensor 110. The amplified output signal from the amplifier 140 can be introduced to the data acquisition system 150, as at 310, to show or display a temperature and/or voltage reading corresponding to the amplified output signal from the amplifier 140, the output signal from the radiation sensor 110, or both.

The measurement operation can be initiated manually via a switch or button 142 on the amplifier 140 or on the data acquisition system 150, or the operation can be part of a pre-programmed test sequence initiated by the data acquisition system 150 or other control system. The temperature of the target medium 105 can be calculated based on the amplified output signal, as at 312. The calculation of the temperature can be at least partially based on a calibration table, a mathematical formula, or other algorithm known to correlate the sensor output voltage to a specific target temperature. The temperature of the target medium 105 is generally displayed using the data acquisition system 150, as at 314.

The pyrometers 100, 200 can sense temperature ranging from a low of about 50° C., about 200° C., about 500° C., or about 1000° C. to a high of about 1,500° C., about 2,000° C., about 2,500° C., or about 3,000° C. For example, the pyrometers 100, 200 can sense temperature ranging from about 100° C. to about 2,750° C., about 350° C. to about 2.250° C., or about 750° C. to about 1,750° C.

Figure 4:
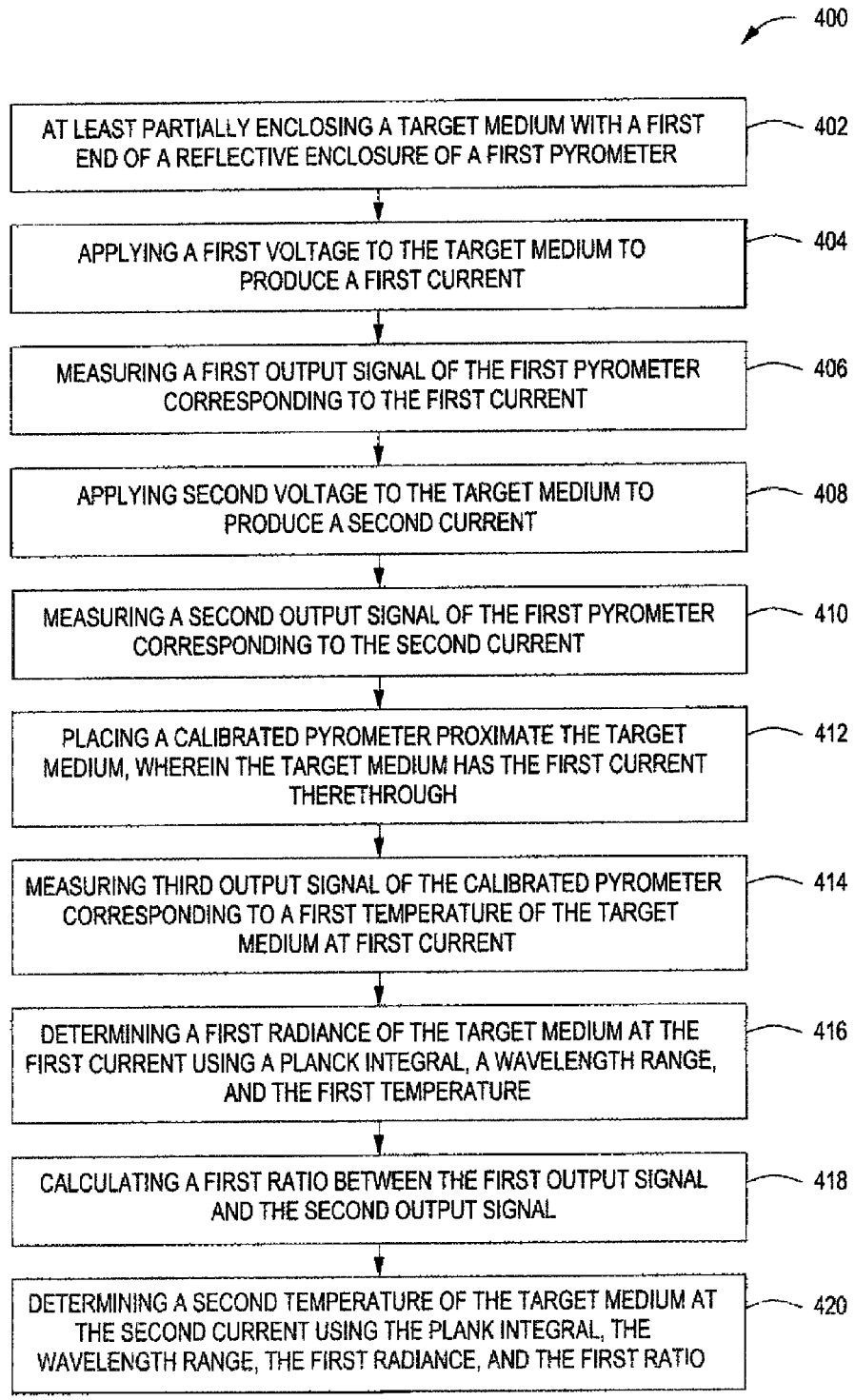
FIG. 4 is a flowchart of an exemplary method for calibrating a pyrometer, according to one or more embodiments described.

Referring to FIG. 4, with continuing reference to FIGS. 1-2, illustrated is a flowchart of an exemplary method 400 for calibrating the pyrometers 100, 200. The pyrometers 100, 200 can be calibrated before use or to verify results. In one method of calibration, either one of the pyrometers 100, 200 can be placed proximate the target medium 105. For example, the reflective enclosure 130 can be at least partially disposed about the target medium 105 to place the radiation sensor 110 proximate the target medium 105. A first end 134 of the reflective enclosure 130 can at least partially enclose the target medium 105, as at 402. The target medium 105 either has a first current therethrough or the first current is induced therethrough, e.g., by applying a first voltage to the target medium 105 and/or one or more resistors joined thereto, as at 404.

A first output signal of the pyrometer 100 or 200 can be measured corresponding to the first current by measuring a first output voltage of the amplifier 140 displayed by the data acquisition system 150, as at 406. As discussed and described above, the first output voltage of the amplifier 140 can be equal to a first output voltage of the radiation sensor 110 scaled or amplified by the gain of the amplifier 140. The measurement can be initiated, for example, by activating the switch 142 to the amplifier 140 or the data acquisition system 150.

While the same pyrometer 100 or 200 is proximate the target medium 105, a second current can be successively induced in the target medium 105, e.g., by applying a second voltage to the target medium 105 and/or one or more resistors electrically connected to the target medium 105, as at 408. A second output signal of the pyrometer 100 or 200 can be measured corresponding to the second current by measuring a second output voltage of the amplifier 140 displayed by the data acquisition system 150, as at 410. The measurement of the output signal is repeated while varying the current through the target medium 105 to get a relationship between the measured output signal and the current through the target medium 105. For example, a DC voltage can be applied to the target medium 105 and incrementally decreased or increased to vary the current in the target medium 105.

Before or after the measurement is taken with the pyrometers 100, 200, a second pyrometer (not shown) can be placed proximate the target medium 105, as at 412. The second pyrometer can have already been calibrated, and/or can be a commercial pyrometer. For example, the second pyrometer can be an imaging ratio pyrometer, such as the Mikron M770 from Mikron Infrared Inc, which is a 2-color or ratio pyrometer. It is known in the art that a ratio pyrometer can measure the temperature of thin wires which underfill the measurement field of a single-color pyrometer. The second pyrometer can be operated in the 1.3 to 1.7 µm wavelength range, for example, and can have enough sensitivity to measure the temperature of the target medium 105 at its highest safe operating current. The second pyrometer can be a two color pyrometer, i.e., the temperature measurement can be made by two independent detectors with different but adjacent narrow band infrared filters. By ratioing the output of these two detectors, the second pyrometer can take a temperature measurement independent of emissivity of the target medium 105, which can be used in spite of contaminants in the second pyrometer's field of view, and can measure a small and/or oscillating target, e.g., target medium 105.

As with the pyrometers 100, 200, the target medium 105 either has the first current therethrough or the first current is induced, e.g., by applying a voltage to the target medium 105. The first current can be high enough to heat the target medium 105 to a temperature that can be measured by the second pyrometer without destroying, e.g., melting, the target medium 105. For example, the first current can be about 0.5 Amperes ("A") or more. In another example, the first current can range anywhere from a low of about 0.1 A to 1 A or more.

Once the target medium 105 has the first current flowing therethrough, the second pyrometer can measure the temperature of the target medium 105 and provide a third output signal that corresponds to a first temperature of the target medium 105 at the first current, as at 414. A first radiance of the target medium 105 at the first current can be determined or calculated for a predetermined wavelength range using a Planck integral or equation and the first temperature, as at 416. The Planck integral can be used to determine radiance emitted over a particular wavelength range. By using the Planck integral, the radiance, R, emitted over a wavelength range can be obtained by:

$$R = \int_{\lambda_2}^{\lambda_1} \frac{2hc^2}{\lambda^5 \left(e^{\frac{hc}{\lambda kT}} - 1\right)},$$

where $\lambda$ is the wavelength, h is the Planck constant, c is the speed of light, k is the Boltzmann constant, and T is the temperature.

Once the first radiance, $R_{T_1}$, for the first temperature, $T_1$, has been calculated, a ratio between the first output signal and the second output signal can be determined, as at 418. A second temperature, $T_2$, of the target medium 105 at the second current can be determined or solved for, as at 420, by setting a ratio of the first radiance to a second radiance equal to the ratio between the first output signal, $S_1$, and the second output signal. $S_2$, as described by:

$$\frac{R_{T_1}}{R_{T_2}} = \frac{S_1}{S_2},$$

where the second radiance, $R_{T_2}$, is calculated by the Plank integral over the same wavelength range with the second temperature, $T_2$.

If the first current is varied or iterated, the temperature for the measured output corresponding to each current value can be calculated or scaled using the same steps described above. In this way a calibration table can be developed for the pyrometers 100, 200.

The same process can be repeated using different optical windows 120 to obtain the characteristics of the pyrometers 100, 200 at different wavelength ranges. For example, the calibration process can be performed first with a sapphire optical window 120 having a wavelength range of from about 0.1 µm to about 5 µm, and then repeated with a silicon optical window 120 having a wavelength range of from about 6.5 pan to about 14 µm.

Example

In order to provide a better understanding of the foregoing discussion, the following non-limiting example is offered.

Although the example may be directed to specific embodiments, it is not to be viewed as limiting the invention in any specific respect.

A DC voltage was applied to connector wires through an 18 Ohm. ("Ω") ballast resistor to apply a voltage across an initiator plug bridgewire that was used as a target medium 105. The DC voltage was decreased from 9 to 5.5 Volts ("V") by steps of 0.5 V to vary the current through the bridgewire. For example, applying 9 V to the connector pig tails through the 18Ω resistor produced a current of 0.5 A through the bridgewire. The corresponding currents running through the resistor and the bridgewire are listed in column one of the Table 1.

TABLE 1

Data from 0.1-5 µm sensor

| Bridgewire Current (A) | Radiation Sensor Signal (mV) (Gain = 199) | Wire Temperature (° C.) | Method | Radiance (0.1-5 µm) |
|---|---|---|---|---|
| 0.500 | 1530 | 693 | Measured | 3.022 |
| 0.472 | 1030 | 622 | Scaled | 2.041 |
| 0.444 | 686 | 556 | Scaled | 1.349 |
| 0.417 | 434 | 490 | Scaled | 0.859 |
| 0.389 | 291 | 439 | Scaled | 0.577 |
| 0.361 | 166 | 375 | Scaled | 0.327 |
| 0.333 | 100 | 326 | Scaled | 0.199 |
| 0.306 | 64 | 286 | Scaled | 0.126 |

A first end of a reflective enclosure 130 of a first pyrometer 100 was screwed around an end of the initiator plug to enclose the bridgewire. The first pyrometer 100 had a radiation sensor 110 (a thermopile detector) and a sapphire optical window 120 with a wavelength range ranging from 0.1 µm to 5 µm disposed in the reflective enclosure 130. An amplified signal from the radiation sensor 110 via an amplifier 140 was measured and recorded with a data acquisition system 150 of the first pyrometer 100 for each current produced by the decreasing voltage across the bridgewire. The amplifier 140 had a gain of 199. The associated amplified sensor signals in millivolts ("mV") are listed in the second column of Table 1.

The same steps were repeated for a second pyrometer 100 having a silicon optical window 120 with a wavelength range ranging from 6.5 µm to 14 µm to obtain a second set of amplified sensor signals corresponding to each current/voltage level in the bridgewire, as shown in Table 2. Note that the voltage applied to the pigtails was stepped down to 3 V for the second pyrometer 100.

TABLE 2

Data from 6.5-14 µm sensor

| Bridgewire Current (A) | Radiation Sensor Signal (mV) (Gain = 199) | Wire Temperature (° C.) | Method | Radiance (6.5-14 µm) |
|---|---|---|---|---|
| 0.500 | 326 | 693 | Measured | 0.984 |
| 0.472 | 279 | 626 | Scaled | 0.842 |
| 0.444 | 234 | 560 | Scaled | 0.708 |
| 0.417 | 199 | 504 | Scaled | 0.600 |
| 0.389 | 166 | 450 | Scaled | 0.501 |
| 0.361 | 130 | 386 | Scaled | 0.392 |
| 0.333 | 105 | 338 | Scaled | 0.317 |
| 0.306 | 83 | 292 | Scaled | 0.251 |
| 0.278 | 64 | 246 | Scaled | 0.192 |
| 0.25 | 50 | 209 | Scaled | 0.150 |
| 0.222 | 36 | 167 | Scaled | 0.108 |

TABLE 2-continued

Data from 6.5-14 µm sensor

| Bridgewire Current (A) | Radiation Sensor Signal (mV) (Gain = 199) | Wire Temperature (° C.) | Method | Radiance (6.5-14 µm) |
|---|---|---|---|---|
| 0.194 | 28 | 139 | Scaled | 0.085 |
| 0.167 | 20 | 105 | Scaled | 0.060 |

Next, a current in the bridgewire was raised to 0.5 A, i.e., its highest safe operating current. The temperature of the bridgewire was then measured with a Mikron M770 imaging ratio pyrometer. The M770 is a 2-color pyrometer that operates in the 1.3 to 1.7 µm wavelength range, and only had enough sensitivity to measure the bridgewire temperature when the current through the bridgewire was high enough to bring the bridgewire to a very high temperature, i.e., almost to its melting point.

The M770 measured a bridgewire temperature of 693° C. for a current of 0.5 A. The physical temperature (693° C.) of the bridgewire M770 measurement at the wire current of 0.5 A was then used to associate a temperature to the amplified sensor signals (1530 MV, 326 mV) from the first and second pyrometers 100 at both wavelength ranges (0.1-5 µm and 6.5-14 µm), as shown in the top row of Table 1 and 2, respectively, for the same current (0.5 A).

The associated radiance at 693° C. for each of the wavelength ranges (0.1-5 µm and 6.5-14 µm) was calculated from the Planck integral in units of Watts/cm$^2$/micron Δλ, where Δλ is the unit spectral bandwidth. See, e.g., the last column of Tables 1 and 2, respectively. At bridgewire currents below 0.5 A the Planck integrals were used to scale the amplified sensor signals to associated temperatures, as shown in Tables 1 and 2. This was accomplished by matching the ratio of Planck integrals with a ratio of amplified sensor signals. For example, the temperature in a first Plank integral was set to the single directly measured temperature value, 693° C., while the temperature in a second Planck integral was varied until the ratio between the two Planck integrals equaled the ratio of the associated amplified sensor signals. For instance, the ratio between the amplified sensor signals is 1030/1530=0.673 at wire currents of 0.5 A and 0.472 A, respectively. Different values of temperature in the second Planck integral were tried until it was found that for 622° C. the ratio between the two Planck integrals equaled the ratio between the amplified sensor signals (0.673). The wire temperature for all the other currents and/or amplified sensor signals was then calculated in the same manner. The resulting scaled temperatures are shown in the third column of Tables 1 and 2.

It was noted that the calibration in Table 2 differed from that in Table 1, likely because the longer wavelength (6.5-14 µm) "sees" or collects radiance signals from the initiator plug material (e.g., ceramic) surrounding the bridgewire in addition to the radiance signals from the bridgewire itself. In addition, the relationship between the wire temperature and wire current was observed to be non-linear, reflecting a balance between a quadratic increase of heating energy with current and a nonlinear increase in cooling with wire temperature.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present disclosure, other and further embodiments of the disclosure may be devised without departing from the basic scope thereof, and the scope thereof is determined by the claims that follow.

What is claimed is:

1. A pyrometer, comprising:
a radiation sensor configured to measure at least a portion of a radiance signal emitted from a target medium and output a voltage that is a function of an average of the absorbed radiance signal, wherein said average is calculated based on a predetermined timeframe;
an optical window disposed proximate the radiation sensor and configured to control a wavelength range of the radiance signal that reaches the radiation sensor;
a reflective enclosure configured to receive the target medium therein, wherein the radiation sensor and the optical window are disposed within the reflective enclosure;
an amplifier in communication with an output of the radiation sensor; and
a data acquisition system in communication with an output of the amplifier, wherein the pyrometer is configured to output the temperature of the target medium, wherein the reflective enclosure has a shape of an ellipsoid of rotation, and
wherein the reflective enclosure is configured to have the target medium disposed at a first focus point of the ellipsoid and the radiation sensor disposed at a second focus point of the ellipsoid.

2. The pyrometer of claim 1, wherein the optical window allows a wavelength range from about 0.1 μm to about 5 μm to pass therethrough and reach the radiation sensor.

3. The pyrometer of claim 1, wherein the optical window allows only a wavelength range from about 6.5 μm to about 14 μm to pass therethrough and reach the radiation sensor.

4. The pyrometer of claim 2, wherein the optical window is a sapphire optical window, wherein the temperature of the target medium is greater than 500 degrees Celsius, and wherein the target medium is comprised of a wire having a diameter less than or equal to 1 mm.

5. The pyrometer of claim 1, wherein the radiation sensor is positioned a distance between about 5 mm and about 25 mm from the target medium.

6. The pyrometer of claim 1, wherein the ellipsoid of rotation is a prolate spheroid.

7. The pyrometer of claim 1, wherein at least a portion of an interior of the ellipsoid of rotation is coated with gold.

8. The pyrometer of claim 1, wherein the target medium comprises wire having a diameter of from about 0.05 mm to about 0.1 mm and a length of from about 2 mm to about 4 mm.

9. The pyrometer of claim 1, wherein the radiation sensor is electrically connected to the amplifier via a thermocouple connector.

10. The pyrometer of claim 1, wherein the pyrometer is capable of measuring the temperature of the target medium in a range from about 100 degrees C. to about 2750 degrees C.

11. A noncontact system for measuring a temperature of a target medium, comprising:
a reflective enclosure having the target medium at least partially therein, a radiation sensor, and an optical window disposed therein, wherein the radiation sensor is configured to absorb at least a portion of power of a radiance signal emitted from the target medium and output a voltage that is a function of an average of the absorbed power, wherein said average is calculated based on a predetermined timeframe, and wherein the optical window is disposed proximate the radiation sensor and configured to control which wavelength range of the radiance signal reaches the radiation sensor;
an amplifier electrically connected to an output of the radiation sensor; and
a data acquisition system electrically connected to an output of the amplifier,
wherein the noncontact system is configured to output the temperature of the target medium,
wherein the reflective enclosure has the shape of an ellipsoid of rotation, and
wherein the radiation sensor is disposed at a first focal point of the ellipsoid and the target medium is disposed at a second focal point of the ellipsoid.

12. The measurement system of claim 11, wherein the radiation sensor and optical window are disposed proximate a first end of the reflective enclosure and the target medium is disposed proximate a second end of the reflective enclosure.

13. The measurement system of claim 11, wherein the target medium comprises wire having a diameter of from about 0.05 mm to about 0.1 mm and a length of from about 2 mm to about 4 mm.

14. The measurement system of claim 11, wherein the target medium is an initiator bridgewire disposed on a pyrotechnic firing circuit initiator.

* * * * *